Sept. 8, 1936.  J. H. AUSTIN  2,053,935

ROLL HEATER AND STEAMER

Filed Jan. 3, 1936

INVENTOR:
John H. Austin
BY H. L. Kirkpatrick
ATTORNEY

Patented Sept. 8, 1936

2,053,935

UNITED STATES PATENT OFFICE 2,053,935

ROLL HEATER AND STEAMER

John H. Austin, Concord, N. H., assignor of fifty one-hundredths to Frank J. Sulloway, Concord, N. H.

Application January 3, 1936, Serial No. 57,385

7 Claims. (Cl. 219—19)

This invention relates to a roll heater and steamer and has for its object to provide a novel apparatus of this character in which rolls or the like may be heated and steamed without becoming soggy due to water condensing thereon. It also may be employed as a roll and frankfort heater and steamer. Further objects and advantages of the device will appear from the following description.

A preferred embodiment of the device is shown in the accompanying drawing in which:—

Figure 1:
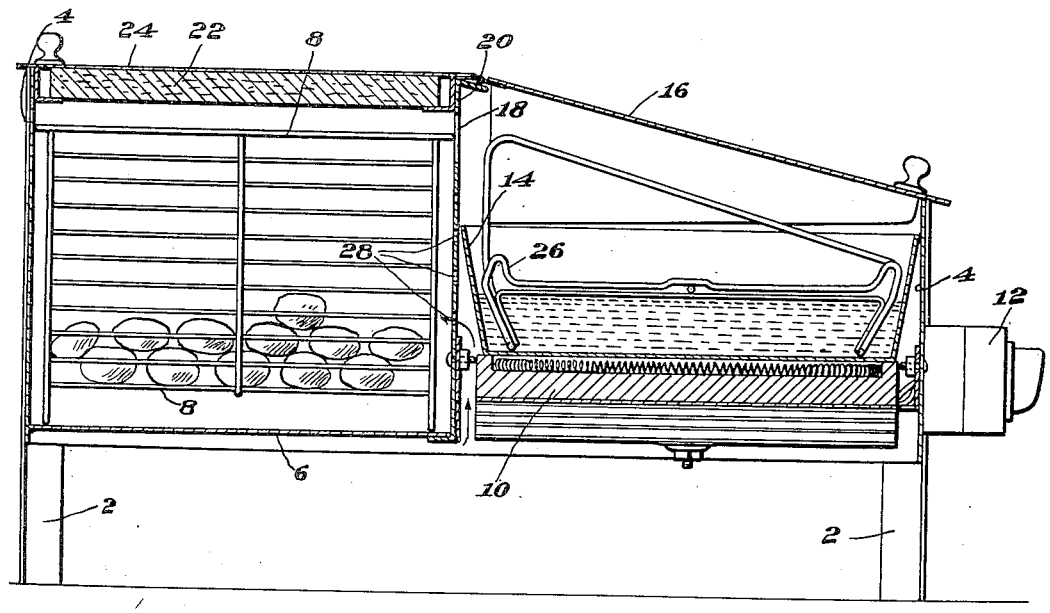
Fig. 1 is a vertical cross-sectional view with certain parts in elevation.
Figure 2:
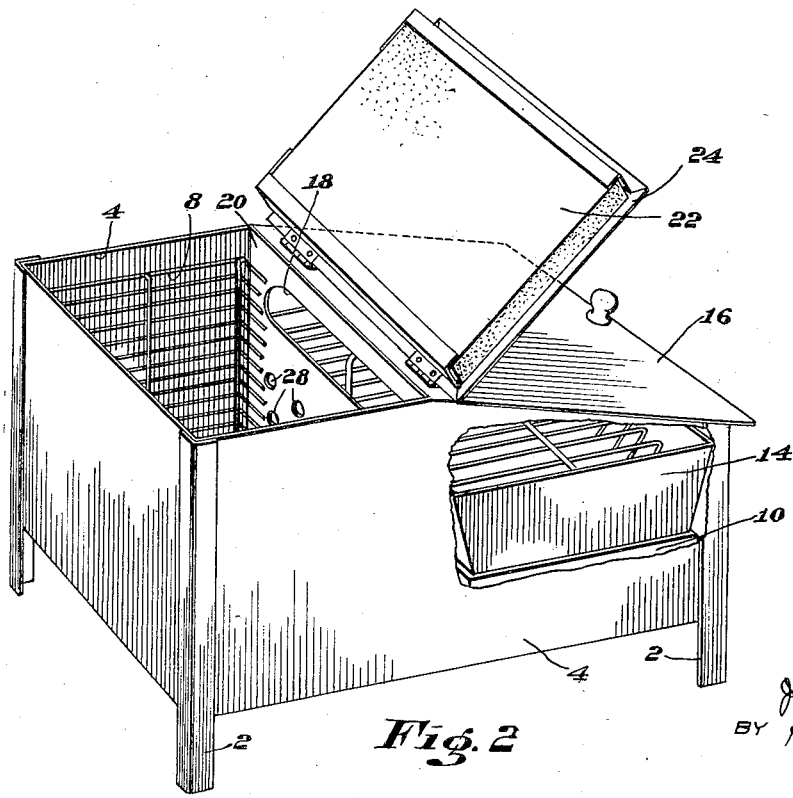
Fig. 2 is a perspective view of the device with certain parts broken away for purposes of clarity.

Referring to the drawing in which like numerals represent like parts,—the preferred embodiment of the device there shown includes a sheet-metal casing or housing having legs 2, walls 4 and bottom 6. The rolls or the like are contained in and held by a wire basket 8 or other suitable means for keeping the rolls or the like from water-absorbing contact with the sheet-metal container on the walls and bottom of which condensate may form or tend to form. In this way such condensate is kept from contact with the rolls or the like. A suitable source of heat is provided as by an electric resistance heating unit 10 controlled by a switch 12, though an oil burner unit or other suitable source of heat will answer the purpose. A water pan 14 is so placed as to be heated by the heating unit 10 and the water therein brought to a boiling or steaming condition. The steam issuing therefrom rises from the pan 14 below the hinged slanting cover 16, and passes through an aperture 18 in the partition 20, and thence into and about the rolls that may be held in the wire basket 8, so as to heat the rolls and maintain them in heated moist condition. The steam is prevented from condensing and, as water, dropping down upon the rolls and rendering them soggy by means of the absorbent insulating ceiling portion 22, which overlies the wire basket 8. This water-absorbent heat-insulating ceiling portion may be made from any suitable material having these characteristics, for example, such as insulite, celotex, or other heat-insulating and water-absorbent medium having poor heat transmission or conduction characteristics and hence the capacity to minimize condensation and to absorb such water as does condense from the steam and thus prevent the water forming in droplets and dropping down upon the underlying rolls and rendering them wet and soggy. The insulating ceiling portion 22 is shown in the preferred form of device illustrated in the drawing as held in a hinged cover 24 so as to give ready access to the rolls. A cover 16 is similarly hinged so as to give access to the water pan 14 which, as shown, is provided with a wire basket 26 to hold frankforts or the like so that they may be heated and steamed directly by the steam issuing from the water pan 14. In addition to the aperture 18 in the partition 20, there is preferably provided in such wall a series of apertures 28 so that heat from the electric resistance unit 10 may be transmitted by radiation and/or convection currents around the sloping sides of the pan 14 and thence through such apertures 28 to the contents of the wire basket 8. It will be seen from the drawing that due to the upper edge of the pan substantially fitting the compartment wherein the pan is placed, the heat therefrom passes through the apertures 28 rather than passing upwardly around the edges of the pan. Circulation is provided by means of the admission of air up through the bottom of the casing adjacent the heating unit 10. Though the dry heated air from around the unit 10 is not in all cases strictly necessary particularly since the partition itself is very hot opposite the unit 10, in most instances a desirable result is secured, especially where it is desired to maintain and/or quickly elevate the temperature of a fresh charge of a large number of rolls in the basket 8.

From the above description it will be seen that I have provided a novel and efficient device for the purpose and which achieves the objects set forth.

Having described my invention what I wish to claim and secure by Letters Patent is:—

1. A roll steaming device of the character described comprising a heating unit, a water pan overlying said heating unit, a sheet-metal casing, means to hold rolls or the like and maintain them from substantial water-absorbing contact with the walls of the casing, said casing having a water-absorbent ceiling overlying said roll holding means to prevent water condensing and dropping upon the rolls or the like.

2. A roll steaming device of the character described comprising an electric resistance heating unit, a water pan overlying said heating unit, a sheet-metal casing, means to hold rolls or the like and maintain them from substantial water-absorbing contact with the walls of the casing, said casing having a heat insulating ceiling overlying said roll holding means to prevent water condensing and dropping upon the rolls or the like.

3. A roll steaming device of the character described comprising a heating unit, a water pan overlying said heating unit, a sheet-metal casing, means to hold rolls or the like and maintain them from water-absorbing contact with the walls and bottom of the casing, and a heat insulating and water-absorbent ceiling overlying and vertically spaced from the rolls in said roll holding means to prevent water condensing and dropping upon the rolls or the like.

4. A roll steaming device of the character described comprising an electric heating unit, a water pan overlying said heating unit, a sheet-metal casing, means to hold rolls or the like and maintain them from water-absorbing contact with the walls and bottom of the casing, and a heat insulating and water-absorbent ceiling overlying and vertically spaced from the rolls in said roll holding means to prevent water condensing and dropping upon the rolls or the like.

5. A roll steaming device of the character described comprising a heating unit, a water pan overlying said heating unit, a rack in said pan to hold frankforts or the like, a sheet-metal casing, means to hold rolls or the like and maintain them from water-absorbing contact with the walls and bottom of the casing, and a heat insulating and water-absorbent ceiling overlying and vertically spaced from the rolls in said roll holding means to prevent water condensing and dropping upon the rolls or the like.

6. A roll steaming device of the character described comprising an electric heating unit, a water pan overlying said heating unit, a sheet-metal casing, means at one side of said unit and said pan to hold rolls or the like and maintain them from water-absorbing contact with the walls and bottom of the casing, and a heat insulating and water-absorbent ceiling overlying and vertically spaced from the rolls in said roll holding means to prevent water condensing and dropping upon the rolls or the like.

7. A roll steaming device of the character described comprising a sheet-metal casing, an electric heating unit, a water pan overlying said heating unit, roll holding means to expose rolls or the like to both dry heat from said unit and steam from said pan and maintain them from water-absorbing contact with the walls and bottom of the casing, and a water-absorbent ceiling overlying and vertically spaced from the rolls in said roll holding means to prevent water condensing and dropping upon the rolls or the like.

JOHN H. AUSTIN.